United States Patent
Anzai

(10) Patent No.: US 8,806,087 B2
(45) Date of Patent: Aug. 12, 2014

(54) COMMUNICATION PATH SPEED DETERMINING METHOD BASED ON PRIORITY OF THE DESTINATION ADDRESS

(75) Inventor: Naozumi Anzai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 13/340,413

(22) Filed: Dec. 29, 2011

(65) Prior Publication Data

US 2012/0096193 A1  Apr. 19, 2012

Related U.S. Application Data

(63) Continuation of application No. PCT/JP2009/062906, filed on Jul. 16, 2009.

(51) Int. Cl.
*G06F 3/00* (2006.01)

(52) U.S. Cl.
USPC .......... 710/38; 710/20; 455/7; 455/11.1

(58) Field of Classification Search
USPC .................. 710/15–20
See application file for complete search history.

(56) References Cited

U.S. PATENT DOCUMENTS

| | | | |
|---|---|---|---|
| 7,319,668 B2 * | 1/2008 | Kobayashi | 370/231 |
| 7,881,660 B2 * | 2/2011 | Takeda et al. | 455/11.1 |
| 7,907,890 B2 * | 3/2011 | Takeda et al. | 455/7 |

FOREIGN PATENT DOCUMENTS

| | | |
|---|---|---|
| JP | 2000-196671 | 7/2000 |
| JP | 2003-244220 | 8/2003 |
| JP | 2006-270470 | 10/2006 |
| JP | 2006-304241 | 11/2006 |
| JP | 4046727 | 11/2007 |
| WO | WO 03/096651 | 11/2003 |
| WO | 03/101132 | 12/2003 |

OTHER PUBLICATIONS

Patent Abstracts of Japan, Publication No. 2006-304241, Published Nov. 2, 2006.
Patent Abstracts of Japan, Publication No. 2006-270470, Published Oct. 5, 2006.
Patent Abstracts of Japan, Publication No. 2000-196671, Published Jul. 14, 2000.
Patent Abstracts of Japan, Publication No. 2003-244220, Published Aug. 29, 2003.
English Abstract of WO 03/096651, Published Nov. 20, 2003 (included in AF).
International Search Report mailed Sep. 29, 2009 in PCT/JP2009/062906.
Japanese Office Action issued Oct. 30, 2012 in corresponding Japanese Patent Application No. 2011-522661.

* cited by examiner

*Primary Examiner* — Tammara Peyton
(74) *Attorney, Agent, or Firm* — Staas & Halsey LLP

(57) ABSTRACT

In a communication apparatus data is inputted to an input section. A priority determination section determines priority of the data inputted by the input section. If the priority of the data determined by the priority determination section is higher than a determined value, then a speed control section sets a transmission speed of the data outputted from an output section to a high value. On the other hand, if the priority of the data determined by the priority determination section is lower than the determined value, then the speed control section sets the transmission speed of the data outputted from the output section to a low value. The output section outputs the data at the set transmission speed.

14 Claims, 17 Drawing Sheets

US 8,806,087 B2

COMMUNICATION PATH SPEED DETERMINING METHOD BASED ON PRIORITY OF THE DESTINATION ADDRESS

This application is a continuing application, filed under 35 U.S.C. §111(a), of International Application PCT/JP2009/062906, filed on Jul. 16, 2009.

FIELD

The embodiments discussed herein are related to a communication apparatus, an information processing apparatus, and a communication control method.

BACKGROUND

As concern for global environment problems and energy problems increases, in recent years the Energy Star program, for example, generally requires the saving of energy in various apparatus. This also applies to communication apparatus. A reduction in the power consumption of communication apparatus is required.

If a link transmission speed is once determined in a communication system such as a wired LAN (Local Area Network), usually the link transmission speed is kept as the amount of packets in a network. This link transmission speed is maintained unless a user himself/herself changes it.

Japanese Laid-open Patent Publication No. 2006-304241
Japanese Laid-open Patent Publication No. 2006-270470

In a wired LAN, for example, the power consumption of a LAN chip in 1000BASE-T in which a transmission speed is high may be at least twice that of a LAN chip in 100BASE-TX in which a transmission speed is low. Accordingly, if communication is always performed in such a communication system, it is necessary to keep a state in which high-speed communication that leads to high power consumption can be performed. However, communication (and data communication itself) the quality of which is guaranteed is not always performed in a network. This is an unnecessary waste of power and is not desirable from the viewpoint of the saving of energy.

SUMMARY

According to an aspect of the present invention, there is provided a communication apparatus including an input section which inputs data, a priority determination section which determines priority of the data inputted by the input section, an output section which outputs the data at a set transmission speed, and a speed control section which sets the transmission speed of the data outputted from the output section to a high value in the case of the priority of the data determined by the priority determination section being higher than a determined value and which sets the transmission speed of the data outputted from the output section to a low value in the case of the priority of the data determined by the priority determination section being lower than the determined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
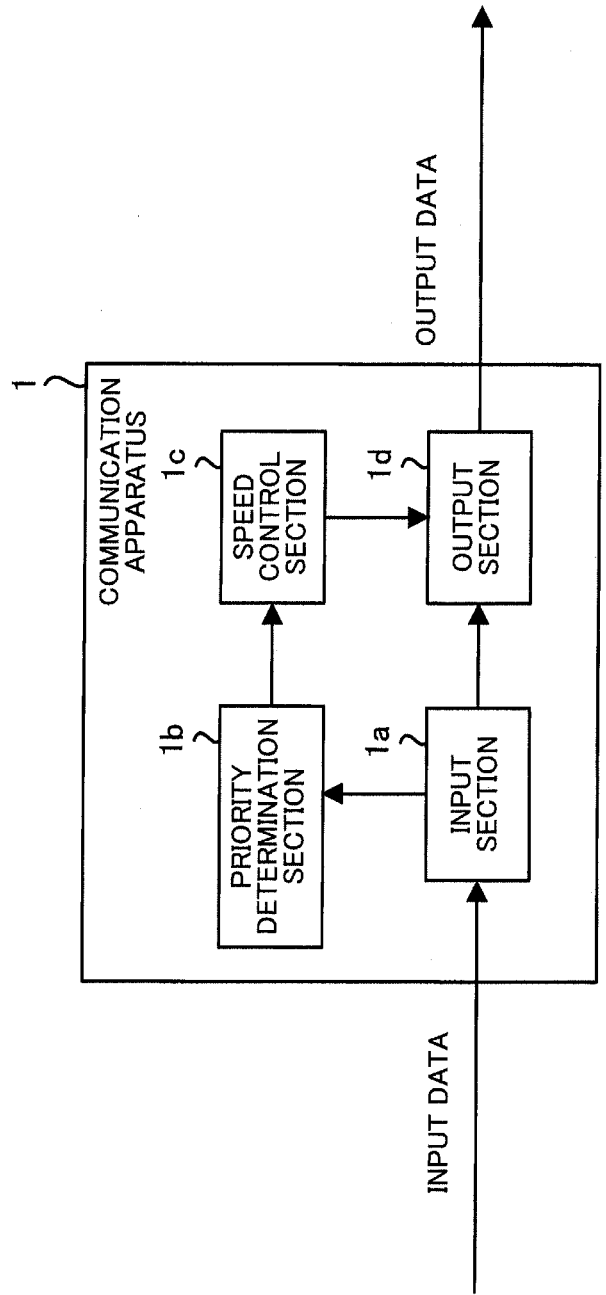
FIG. 1 illustrates a communication apparatus according to a first embodiment.

Embodiments of the present invention will now be described with reference to the accompanying drawings, wherein like reference numerals refer to like elements throughout.

(First Embodiment)

FIG. 1 illustrates a communication apparatus according to a first embodiment. A communication apparatus 1 illustrated in FIG. 1 changes a transmission speed according to the priority of data. The communication apparatus 1 includes an input section 1a, a priority determination section 1b, a speed control section 1c, and an output section 1d.

The input section 1a can be connected via a communication line to another apparatus, such as a communication apparatus or an information processing apparatus, having a communication function. Input data transmitted from such an apparatus is inputted to the input section 1a.

The priority determination section 1b determines the priority of the data inputted by the input section 1a. The priority of data can be determined on the basis of information indicative of whether or not it is necessary to transmit the data at a high speed. A VLAN (Virtual LAN) tag of a LAN (Local Area Network) frame indicative of QoS (Quality of Service) setting, priority included in a ToS (Type of Service) field of an IP (Internet Protocol) packet, a destination address included in a LAN frame or an IP packet, a destination port number included in an IP packet, or the like indicated by control information included in a header of the data is used as such information.

QoS is a technique for reserving a band for specific communication and guaranteeing a certain transmission speed. QoS is used for services, such as real-time distribution of voice or moving images or a video telephone, in which it is necessary to prevent a communication delay or a stoppage of communication. Normal standards for QoS are IEEE 802.1p, IEEE 802.11e, and the like.

If the priority of the data determined by the priority determination section 1b is higher than a determined value, then the speed control section 1c sets the transmission speed of the data to be outputted from the output section 1d to a high value. On the other hand, if the priority of the data determined by the priority determination section 1b is lower than the determined value, then the speed control section 1c sets the transmission speed of the data to be outputted from the output section 1d to a low value. By doing so, the data can be transmitted or received at a transmission speed corresponding to the priority determined.

The output section 1d outputs the output data at a set transmission speed. The data outputted from the output section 1d is transferred via a communication line to another apparatus, such as a communication apparatus.

As has been described, a transmission speed is changed on the basis of priority for communicating data. As a result, a transmission speed of lower priority data is reduced. By doing so, the amount of high-speed communication the power consumption of which is high can be reduced rationally and power saving can be realized.

(Second Embodiment)

A layer 2 switch relays a packet at the data link layer, particularly on the basis of a MAC (Media Access Control) address. In a second embodiment this layer 2 switch is used as the communication apparatus and description will be given. However, the communication apparatus may be applied to another apparatus. As described later in a third embodiment, for example, the communication apparatus can also be applied to an IP router or a layer 3 switch which relays a packet at the network layer on the basis of an IP address. Furthermore, the unit of data at the layer 2 in the OSI (Open Systems Interconnection) reference model may also be referred to as a "packet". For convenience of explanation, however, the term "frame" will be used uniformly in the second embodiment.

Figure 2:
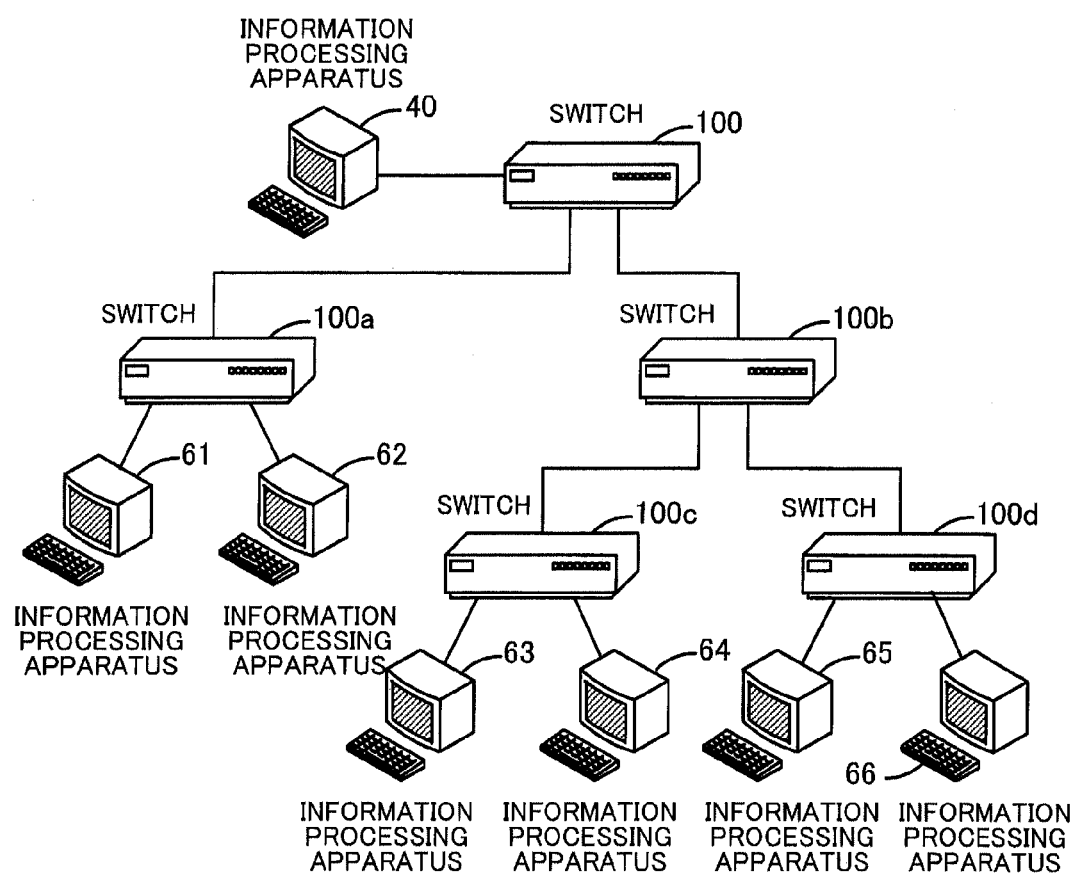
FIG. 2 illustrates the overall structure of a communication system according to a second embodiment.

FIG. 2 illustrates the overall structure of a communication system according to a second embodiment. In a communication system according to a second embodiment a plurality of layer 2 switches relay a frame at the data link layer so that data can be exchanged between information processing apparatus.

A system illustrated in FIG. 2 includes switches 100, 100a, 100b, 100c, and 100d and information processing apparatus 40, 61, 62, 63, 64, 65, and 66. The switches 100, 100a, 100b, 100c, and 100d are layer 2 switches. The configuration of the switches 100a, 100b, 100c, and 100d is the same as that of the switch 100 and the switches 100a, 100b, 100c, and 100d have the same functions as the switch 100 has.

The switch 100 is connected to the information processing apparatus 40 and the switches 100a and 100b. The switch 100b is connected to the switches 100c and 100d. The information processing apparatus 61 and 62 are connected to the switch 100a. The information processing apparatus 63 and 64 are connected to the switch 100c. The information processing apparatus 65 and 66 are connected to the switch 100d. The information processing apparatus 40 is connected to the switch 100. Two switches or a switch and an information processing apparatus are connected by one or more physical links (network cables) such as LANs.

The switches 100, 100a, 100b, 100c, and 100d relay a frame from a source information processing apparatus to a destination information processing apparatus in accordance with an address included in the frame. For example, when the information processing apparatus 40 transmits a frame to the information processing apparatus 63, the frame is relayed by the switches 100, 100b, and 100c in that order.

Figure 3:
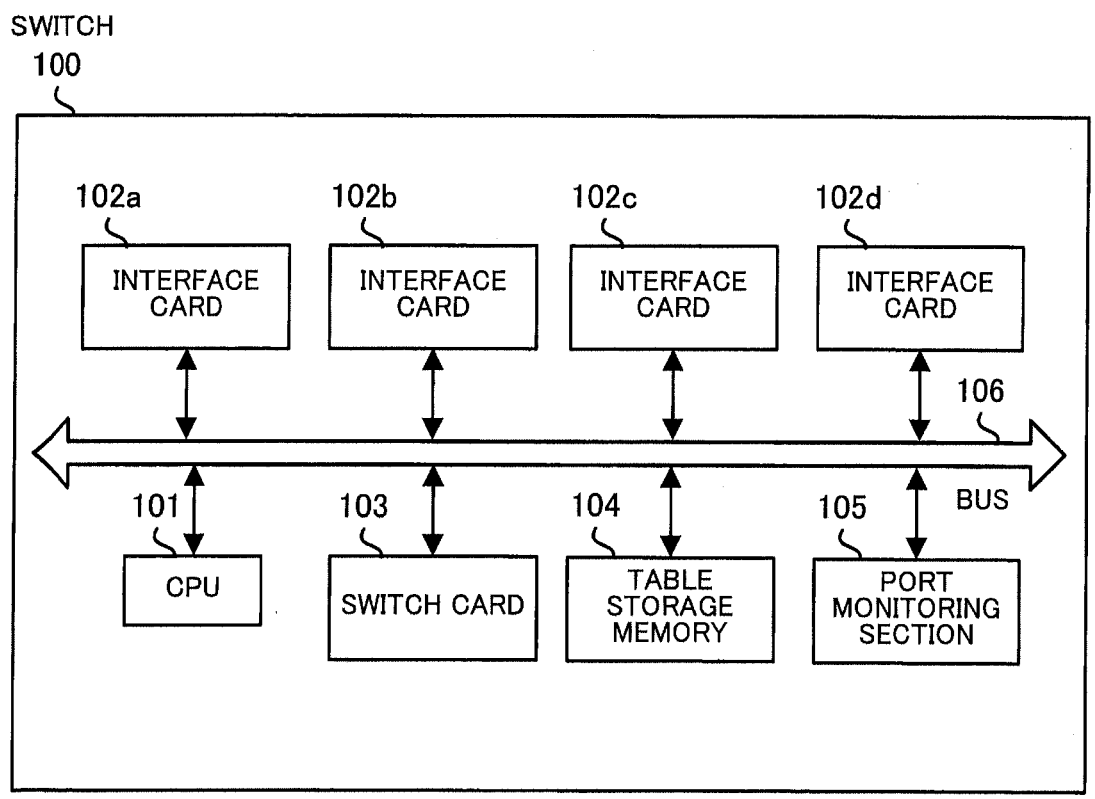
FIG. 3 illustrates the hardware configuration of a switch in the second embodiment.

FIG. 3 illustrates the hardware configuration of a switch in the second embodiment. FIG. 3 illustrates the internal configuration of the switch 100. The switches 100a, 100b, 100c, and 100d can also be realized by adopting the same configuration. The switch 100 includes a CPU (Central Processing Unit) 101, interface cards 102a, 102b, 102c, and 102d, a switch card 103, a table storage memory 104, a port monitoring section 105, and a bus 106.

The CPU 101 controls the whole of the switch 100. The CPU 101 performs a process based on a program. The CPU 101 executes a program held in a memory (not illustrated) by the use of data held in the memory. The CPU 101 receives a command transmitted from the information processing apparatus 40 used by a manager and returns a result obtained by executing the command to the information processing apparatus 40, via a communication interface (not illustrated).

The table storage memory 104 stores a plurality of tables including a table of managing the structure of a logical link, a table for determining a frame destination in the logical link, and a table which stores information indicative of the frame destination.

The CPU 101, the interface cards 102a, 102b, 102c, and 102d, the switch card 103, the table storage memory 104, and the port monitoring section 105 are connected to one another by the bus 106.

Each of the interface cards 102a, 102b, 102c, and 102d includes a plurality of (eight, for example) communication ports. One physical link can be connected to each communication port. Each of the interface cards 102a, 102b, 102c, and 102d monitors each communication port and acquires a frame. In preparation for the simultaneous arrival of frames at a plurality of communication ports, each of the interface cards 102a, 102b, 102c, and 102d includes an internal buffer for temporarily holding the frames. Each of the interface cards 102a, 102b, 102c, and 102d then transmits the acquired frames to the switch card 103.

The switch card 103 includes a learning table (not illustrated). The switch card 103 associates a source address of a frame received in the past with identification information for a communication port at which the frame arrived or a logical link along which the frame arrived, and stores them in the learning table. This learning table is updated at any time by the switch card 103.

When the switch card 103 receives a frame from one of the interface cards 102a, 102b, 102c, and 102d, the switch card 103 refers to the learning table and determines a destination to which the frame is to be transferred. If the determined destination to which the frame is to be transferred is a logical link, then the switch card 103 refers to a table stored in the table storage memory 104 and determines the interface card 102a, 102b, 102c, or 102d and a communication port used for transferring the frame. After that, the switch card 103 transmits the frame to the interface card 102a, 102b, 102c, or 102d determined.

The interface card 102a, 102b, 102c, or 102d which receives the frame outputs the frame from the determined communication port to the destination.

The port monitoring section 105 monitors the communication ports of the interface cards 102a, 102b, 102c, and 102d. When the port monitoring section 105 detects a fault in or restoration of any of physical links connected to the communication ports of the interface cards 102a, 102b, 102c, and 102d, the port monitoring section 105 gives the CPU 101 notice to that effect.

Figure 4:
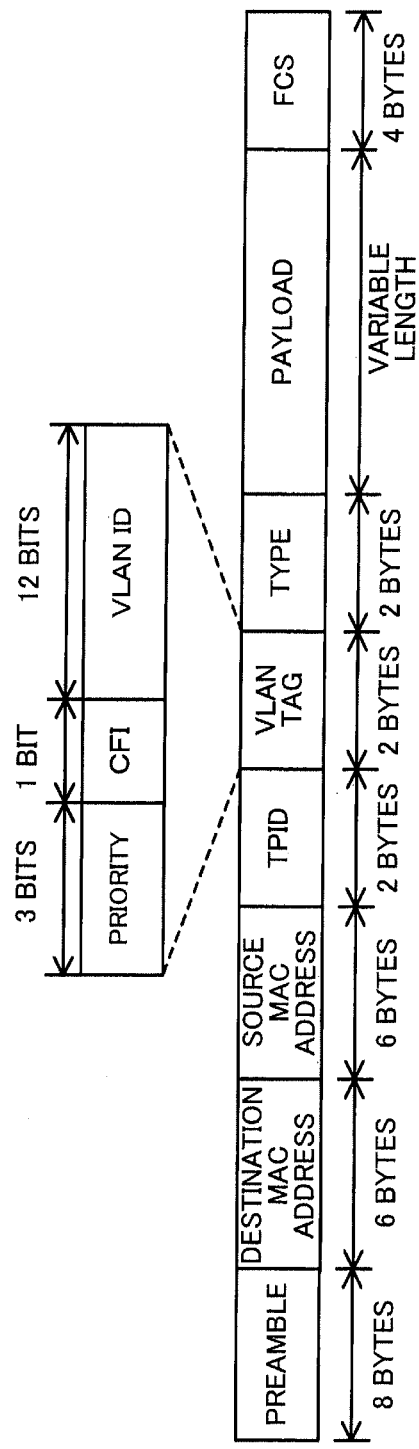
FIG. 4 is an example of the data structure of a frame in the second embodiment.

FIG. 4 is an example of the data structure of a frame in the second embodiment. In this embodiment a frame illustrated in FIG. 4 is exchanged between the switch 100 and the switch 100a, the switch 100b, or the like described above in FIG. 2 via a communication port of the interface card 102a, 102b, 102c, or 102d described above in FIG. 3.

The frame illustrated in FIG. 4 includes Preamble, Destination MAC Address, Source MAC Address, TPID (Tag Protocol Identifier), VLAN Tag, Type, Payload, and FCS (Frame Check Sequence) fields. In addition, the VLAN Tag field includes Priority, CFI (Canonical Format Indicator), and VLAN ID subfields.

The Preamble, Destination MAC Address, Source MAC Address, TPID, VLAN Tag, and Type fields make up a header section including control information. Furthermore, the Payload field is a payload section and the FCS field is an FCS section.

The Preamble field is an 8-byte area in which a bit string for giving notice of the beginning of frame transmission and providing timing for synchronization is indicated. The Destination MAC Address field is a 6-byte area in which an address for uniquely identifying a communication interface included in a destination information processing apparatus is indicated. The Source MAC Address field is a 6-byte area in which an address for uniquely identifying a communication interface included in a source information processing apparatus is indicated. The TPID field is a 2-byte area in which the type of the frame (whether the frame is, for example, a VLAN frame or an ordinary frame) is indicated.

The VLAN Tag field is a 2-byte area in which a uniquely set value assigned to each logical network is indicated in the case of one network being divided for operation into a plurality of logical networks.

The Priority subfield included in the VLAN Tag field is defined in IEEE 802.1p and is a 3-bit area in which priority is indicated. The level of frame priority used for setting traffic priority is indicated by one of eight ranks in the Priority subfield. The CFI subfield is a 1-bit area in which a MAC address format (CSMA/CD (Carrier Sense Multiple Access/Collision Detection) format or FDDI (Fiber-Distributed Data Interface) format) is designated. The VLAN ID subfield is a 12-bit area in which a VLAN to which the frame belongs is indicated.

The Type field is a 2-byte area in which a protocol used is designated. The Payload field is a variable-length area which accommodates data proper to be transmitted or received. For example, determined-length data obtained by dividing an IP frame is stored. The FCS field is a 4-byte area in which a value used for detecting an error in a received frame is indicated.

Various modifications of the data structure of a frame are possible according to, for example, the form of the operation of a network. For example, information other than that indicated in FIG. 4 may be added. On the other hand, a part of the information indicated in FIG. 4 may be omitted.

Figure 5:
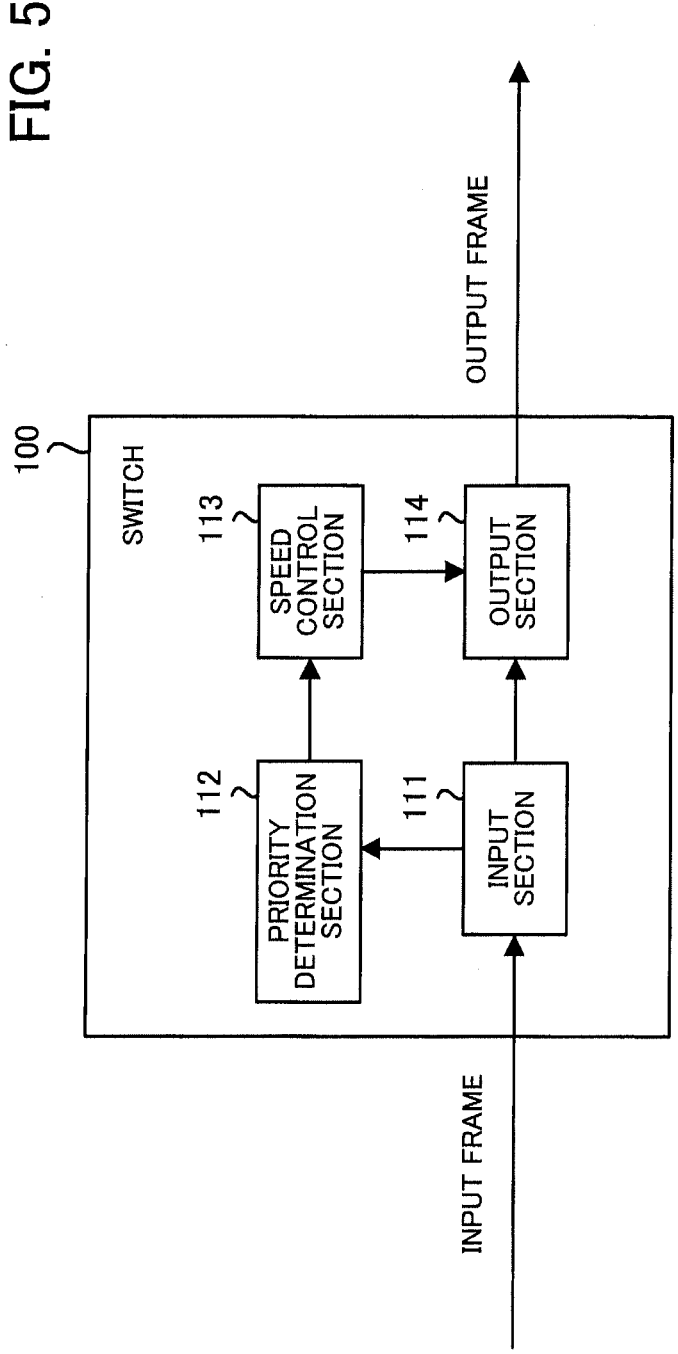
FIG. 5 is a block diagram of the switch in the second embodiment.

FIG. 5 is a block diagram of the switch in the second embodiment. FIG. 5 illustrates the functions of the switch 100. However, the other switches 100a, 100b, 100c, and 100d described in FIG. 2 can also be realized by the same structure as the switch 100 has, and the functions of the switches 100a, 100b, 100c, and 100d are the same as those of the switch 100.

On the basis of control information, such as QoS, included in data transmitted or received, the switch 100 in this embodiment changes a frame transmission speed according to the priority of a data flow indicated by frames into which data is divided. The switch 100 includes an input section 111, a priority determination section 112, a speed control section 113, and an output section 114.

The switch 100 in this embodiment is a layer 2 switch and transmits or receives data by dividing it into a plurality of frames. Each of the frames into which the data is divided includes control information in its header section. The control information is used for transferring the data. As described above in FIG. 4, the control information included in the header section includes priority information indicative of priority in data transmission and destination address information indicative of an MCA address of a frame destination. A destination address included in each frame is a MAC address.

The input section 111 can be connected via a physical link, such as a LAN, to another switch, information processing apparatus, or the like having a communication function. Data transmitted from such an apparatus is inputted to the input section 111 as input frames.

The priority determination section 112 determines the priority of a data flow inputted by the input section 111 in the form of a frame. The priority determination section 112 determines the priority of a data flow on the basis of information indicative whether or not it is necessary to transmit the data at a high speed. Priority in a ToS field, a destination MAC address, or the like indicated by control information included in a header of a frame corresponds to such information.

If at this time the value of priority (described above in FIG. 4) indicated by control information included in a header section of a data frame inputted from the input section 111 is higher than a determined threshold (determined value), then the priority determination section 112 determines that the priority of the data flow is high. On the other hand, if the value of the priority indicated by the control information included in the header section of the data frame inputted from the input section 111 is lower than the determined value, then the priority determination section 112 determines that the priority of the data flow is low.

In addition, if a destination MAC address indicated by the control information included in the header section of the data frame inputted from the input section 111 is a determined address such as a source MAC address, then the priority determination section 112 determines regardless of the value of the priority that the priority of the data flow is high. On the other hand, if the destination MAC address indicated by the control information included in the header section of the data frame inputted from the input section 111 is not the determined address, then the priority determination section 112 determines that the priority of the data flow is low. As a result, when the switch 100 communicates with a determined apparatus, the switch 100 can set a high priority and ensure high-speed communication.

The priority determination section 112 may indicate a priority determination result by one of three or more ranks. For example, the priority determination section 112 may indicate a priority determination result by one of three ranks: "low," "medium," and "high".

If the priority of the data flow determined by the priority determination section 112 is higher than the determined value, then the speed control section 113 sets a transmission speed of data outputted from the output section 114 to a high value. On the other hand, if the priority of the data flow determined by the priority determination section 112 is lower than the determined value, then the speed control section 113 sets a transmission speed of data outputted from the output section 114 to a low value. By doing so, data can be transmitted or received at a transmission speed corresponding to priority determined.

To be concrete, if the priority of the data flow determined by the priority determination section 112 is higher than the determined value, then the speed control section 113 sets a transmission speed of data outputted from the output section 114 to a high value (1000BASE-T, for example). On the other hand, if the priority of the data flow determined by the priority determination section 112 is lower than the determined value, then the speed control section 113 sets a transmission speed of data outputted from the output section 114 to a low value (100BASE-TX, for example).

The output section 114 outputs data as an output frame at a set transmission speed. The data outputted from the output section 114 is transferred to another switch or information processing apparatus via a physical link such as a LAN. At this time the output section 114 temporarily disconnects links established between output ports 141, 142, 143, and so on described later in FIG. 6 and destinations to which data is transferred, and establishes the links again at transmission speeds corresponding to the results of priority determination by the priority determination section 112. By doing so, the output section 114 changes data transmission speeds to transmission speeds set by the speed control section 113.

In this embodiment priority is determined on the basis of information included in a header section of a frame inputted to the switch 100. However, priority may be determined on the basis of information included in header section of a frame outputted from the switch 100.

Figure 6:
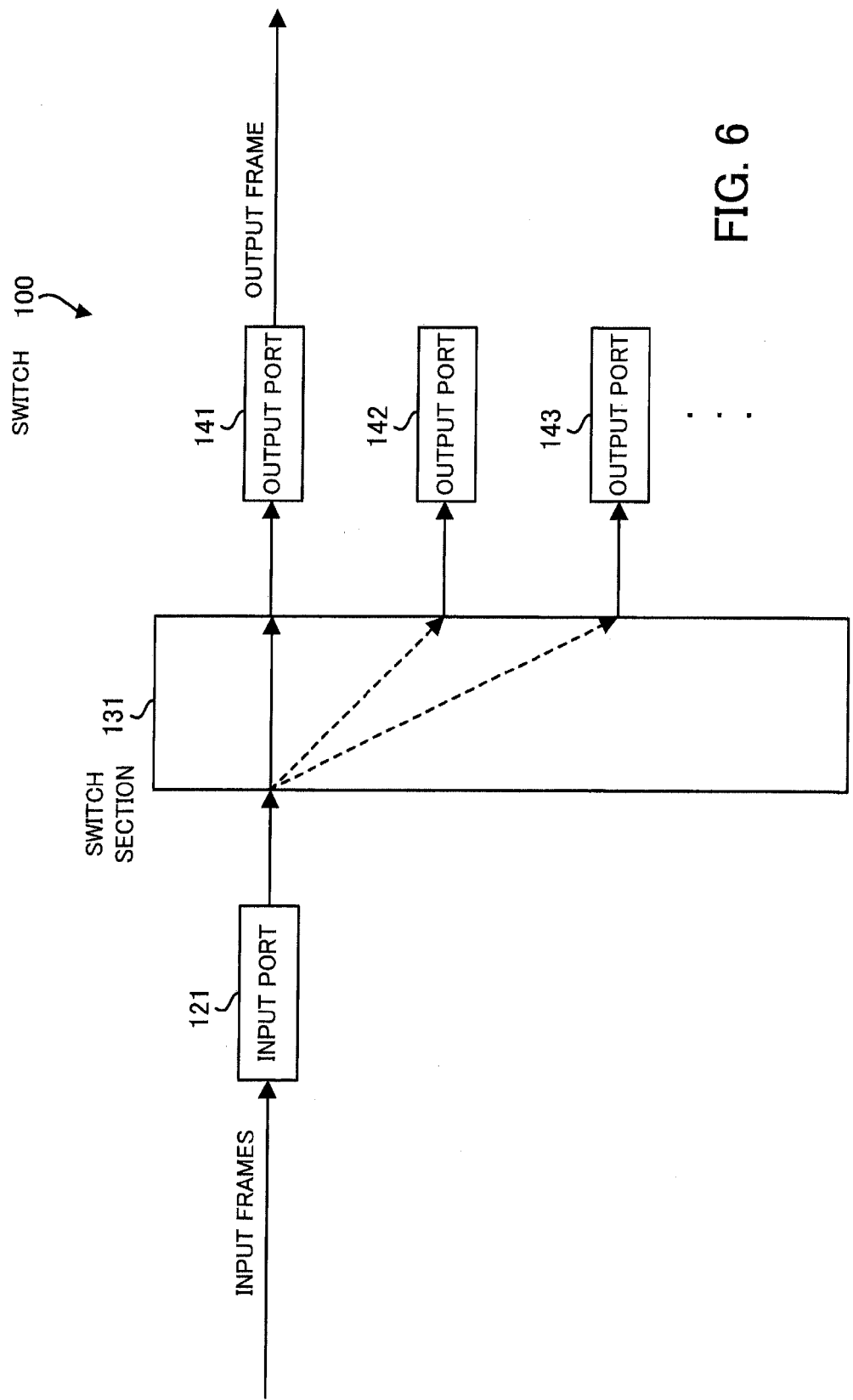
FIG. 6 is a view for giving an overview of the switch in the second embodiment.

FIG. 6 is a view for giving an overview of the switch in the second embodiment. With the switch 100 described above in FIG. 2, as illustrated in FIG. 6, input frames inputted from an input port 121 are distributed by a switch section 131 among the output ports 141, 142, 143, and so on and are outputted as output packets.

Frames are inputted to the input port 121. The switch section 131 distributes the frames among the output ports 141, 142, 143, and so on according to destinations indicated in header sections of the frames, and transfers them. The frames inputted to the input port 121 are outputted from the output ports 141, 142, 143, and so on. As a result, the frames inputted to the switch 100 are relayed toward the destinations.

Figure 7:
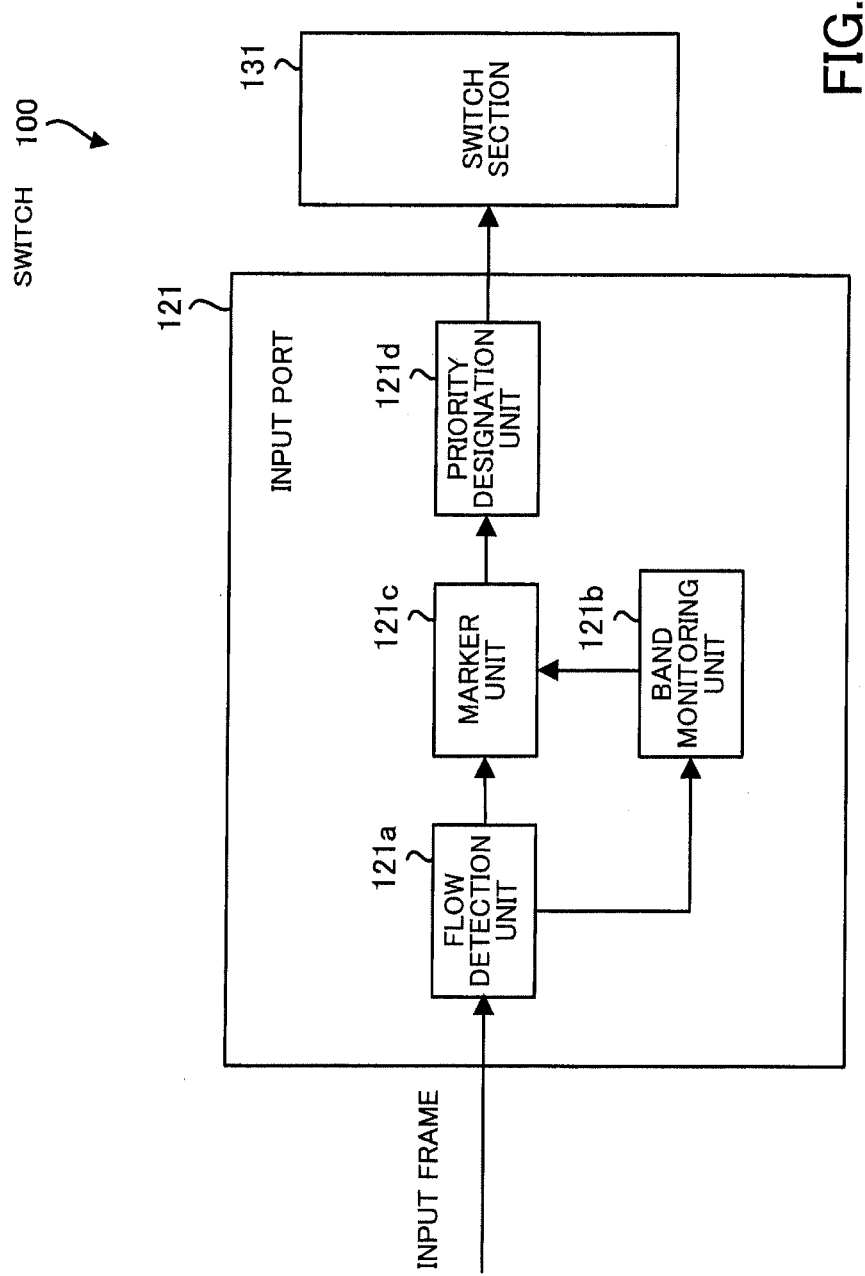
FIG. 7 is a block diagram of an input port in the second embodiment.

FIG. 7 is a block diagram of the input port in the second embodiment. As described above in FIG. 6, the input port 121 is connected to the switch section 131 and transfers a flow inputted to the switch 100 to the switch section 131. The input port 121 includes a flow detection unit 121*a*, a band monitoring unit 121*b*, a marker unit 121*c*, and a priority designation unit 121*d*.

When a flow which is made up of a series of frames is inputted to the switch 100 in this embodiment, the flow detection unit 121*a* detects the inputted flow on the basis of control information included in header sections of the frames.

The band monitoring unit 121*b* monitors a band of the flow inputted to the input port 121.

The marker unit 121*c* rewrites priority of the detected flow. By doing so, set priority of the data flow can be changed. With the switch 100 in this embodiment priority (described above in FIG. 4) is rewritten. However, if the switch 100 is a layer 3 switch or the like and packets are inputted, priority included in a ToS field of each of packets which make up an inputted flow may be rewritten. DSCP (DiffServ Code Point) may be used for indicating the priority of a packet.

The priority designation unit 121*d* determines priority for outputting flows and queuing.

Figure 8:
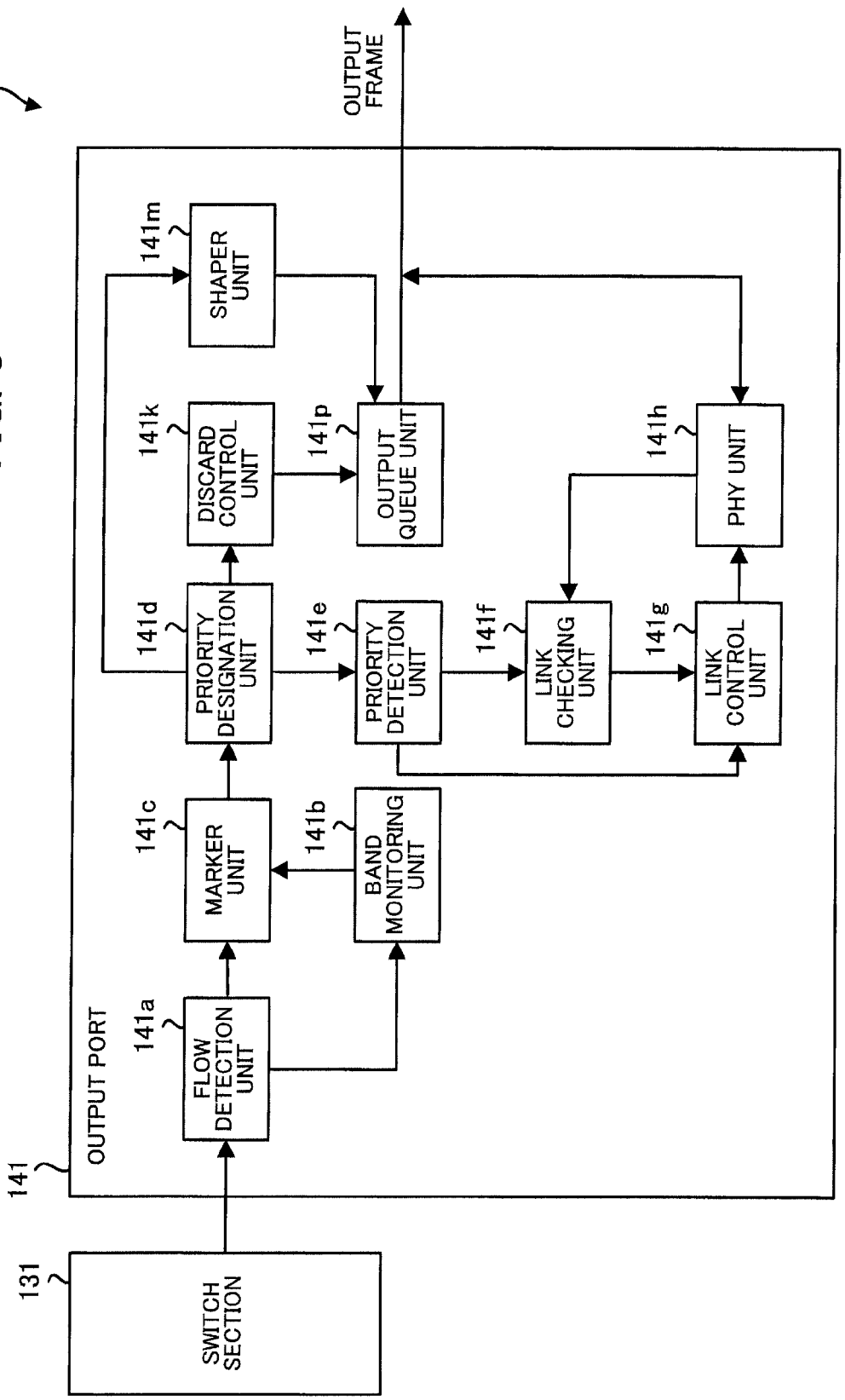
FIG. 8 is a block diagram of an output port in the second embodiment.

FIG. 8 is a block diagram of the output port in the second embodiment. As described above in FIG. 6, the output ports 141, 142, 143, and so on are connected to the switch section 131 and output a flow distributed by the switch section 131 to another communication apparatus or information processing apparatus connected to the switch 100. The output port 141 includes a flow detection unit 141*a*, a band monitoring unit 141*b*, a marker unit 141*c*, a priority designation unit 141*d*, a priority detection unit 141*e*, a link checking unit 141*f*, a link control unit 141*g*, a PHY unit 141*h*, a discard control unit 141*k*, a shaper unit 141*m*, and an output queue unit 141*p*.

The flow detection unit 141*a* detects a flow transferred from the switch section 131 on the basis of control information included in a header section of a frame.

The band monitoring unit 141*b* monitors a band of a flow outputted from the output port 141.

The marker unit 141*c* rewrites priority of the detected flow.

The priority designation unit 141*d* determines priority for outputting flows and queuing.

The priority detection unit 141*e* detects the priority which is indicated by a frame and which is determined by the priority designation unit 141*d* and controls the link checking unit 141*f* and the link control unit 141*g*.

The link checking unit 141*f* checks the state of a link with another information processing apparatus, switch, or the like connected to the output port 141, and maintains data for the state of the last link.

The link control unit 141*g* changes a link transmission speed at which data is to be transmitted. At this time the link control unit 141*g* temporarily disconnects the link with a destination to which the data is to be transmitted, and then establishes a link with the destination to which the data is to be transmitted at a new transmission speed. By doing so, a link transmission speed is changed.

The PHY unit 141*h* is at the first layer in the OSI reference model and is a physical connection of a network.

The discard control unit 141*k* exercises control so as to place a frame in a queue or discard the frame.

The shaper unit 141*m* controls order in which frames are outputted or a band for outputting frames.

The output queue unit 141*p* temporarily holds data which waits until being outputted. The held data which waits until being outputted is read out on the basis of a certain rule and is then outputted.

Figure 9:
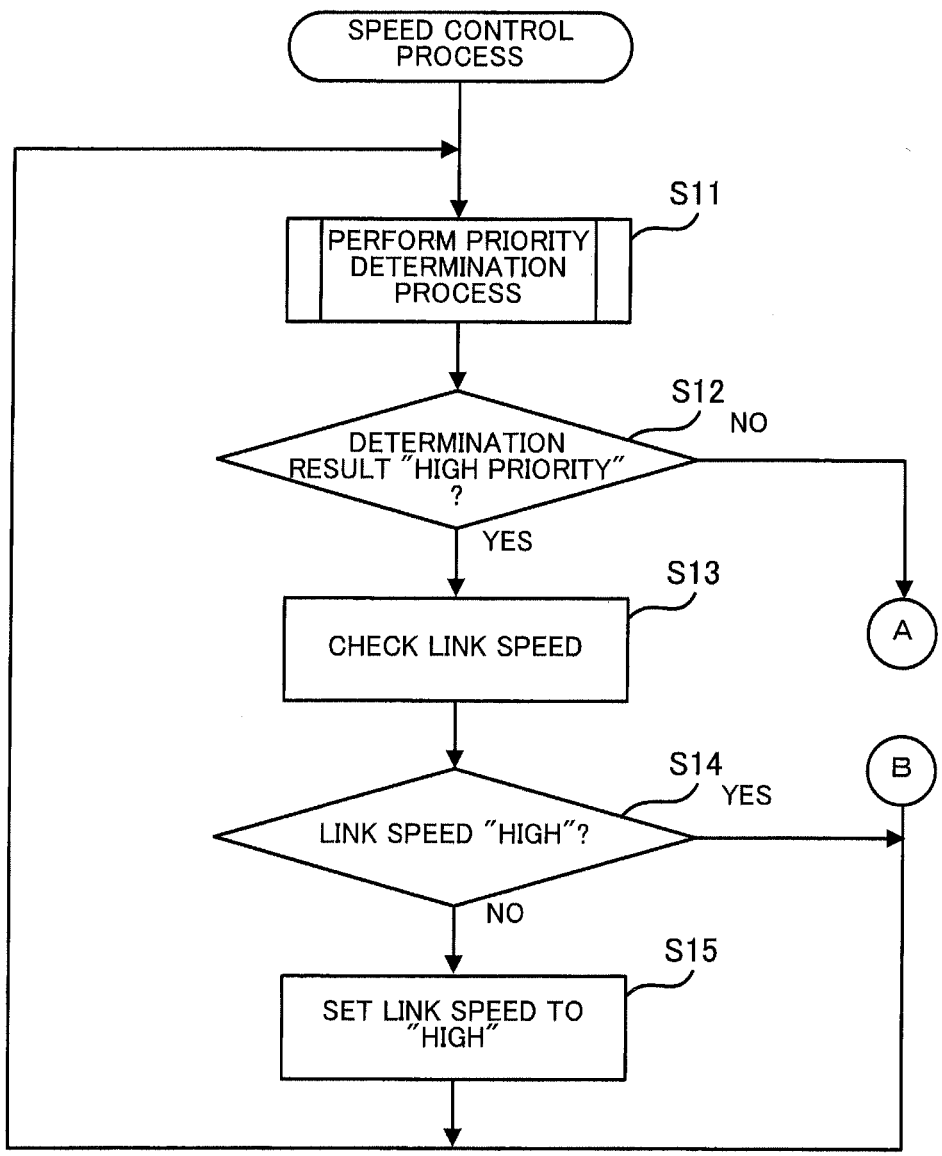
FIG. 9 is a flow chart of a procedure for a speed control process (part 1)
Figure 10:
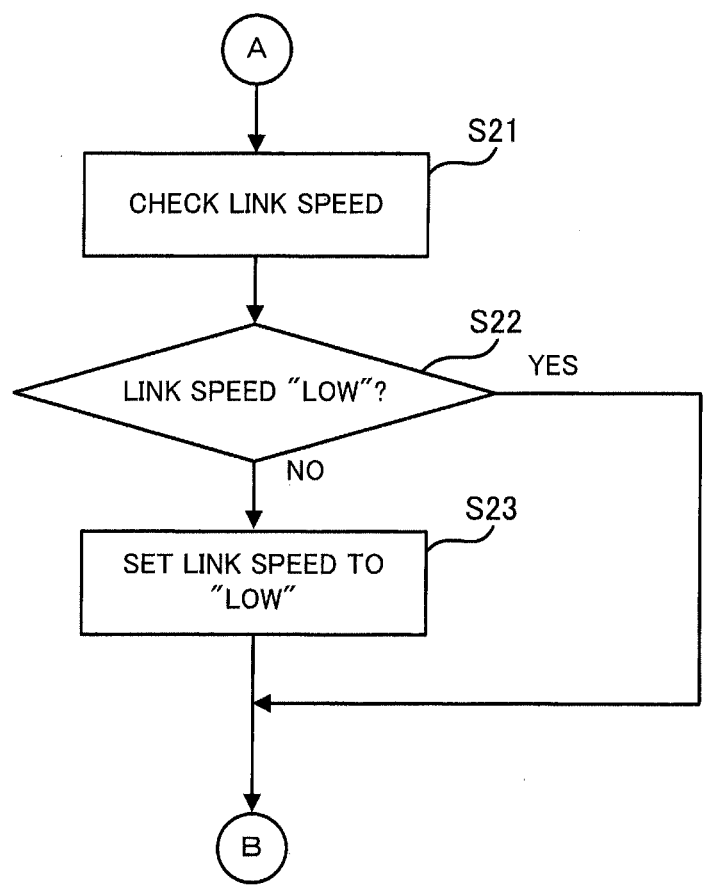
FIG. 10 is a flow chart of a procedure for a speed control process (part 2)

FIGS. 9 and 10 are flow charts of a procedure for a speed control process. A speed control process indicated in FIGS. 9 and 10 is performed by the switch 100 (described above in FIG. 2) for controlling a link speed according to the priority of a data flow. A speed control process in this embodiment is performed after the beginning of communication by the switch 100.

In this embodiment it is assumed that the switch 100 sets a link transmission speed to one of "low (100BASE-TX, for example)" and "high (1000BASE-T, for example)".

(Step S11) The priority determination section 112 (described above in FIG. 5) performs a priority determination process (described later in FIG. 12).

(Step S12) The priority determination section 112 determines whether or not a determination result obtained by the priority determination process in step S11 is "high priority". If a determination result is "high priority", then step S13 is performed next. On the other hand, if a determination result is not "high priority", then step S21 (FIG. 10) is performed next.

(Step S13) The speed control section 113 (described above in FIG. 5) checks a link speed.

(Step S14) The speed control section 113 determines whether or not the link speed checked in step S13 is "high". If the link speed is "high", then step S11 is performed next. On the other hand, if the link speed is not "high", then step S15 is performed next.

(Step S15) The speed control section 113 sets the link speed to "high". After that, step S11 is performed.

(Step S21) The speed control section 113 checks a link speed.

(Step S22) The speed control section 113 determines whether or not the link speed checked in step S21 is "low". If the link speed is "low", then step S11 (FIG. 9) is performed next. On the other hand, if the link speed is not "low", then step S23 is performed next.

(Step S23) The speed control section 113 sets the link speed to "low". After that, step S11 is performed.

In this embodiment the switch 100 may set a link transmission speed by the use of speed standards other than the above two speed standards. In addition, three or more speed levels may be used.

Furthermore, in this embodiment the priority of a data flow is determined by the use of all frames. However, the priority of a data flow may be determined by the use of only frames extracted according to a determined rule. In addition, the priority of a data flow may be determined by the use of a leading frame of the data flow.

Figure 11:
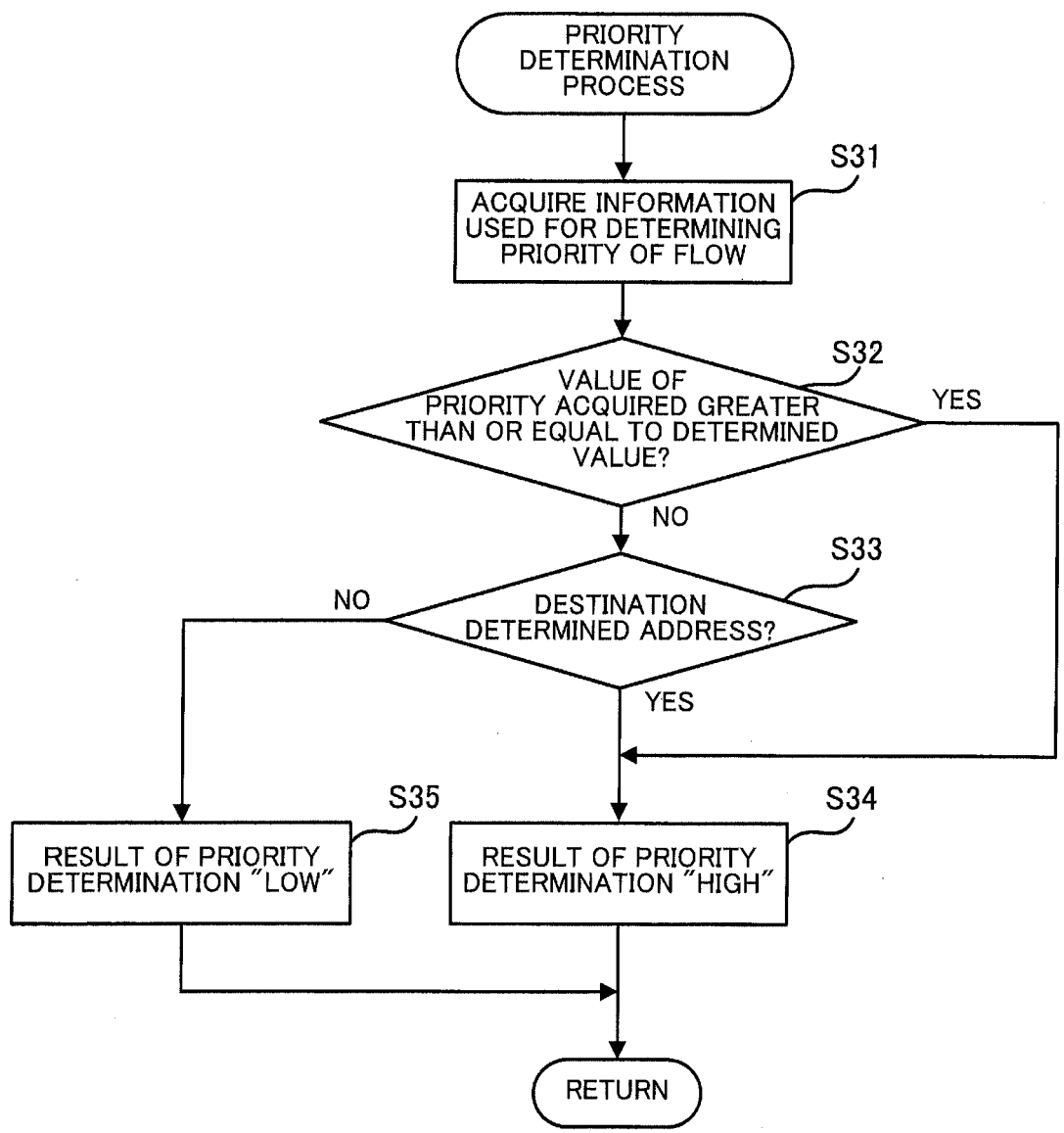
FIG. 11 is a flow chart of a procedure for a priority determination process in the second embodiment.

FIG. 11 is a flow chart of a procedure for the priority determination process in the second embodiment. The priority determination process indicated in FIG. 11 is performed for determining the priority of a data flow inputted to the switch 100 on the basis of a frame included in the data flow. The priority determination process in this embodiment is invoked and performed in step S11 of the speed control process (described above in FIGS. 9 and 10).

(Step S31) The priority determination section 112 (described above in FIG. 5) acquires priority included in a frame of a data flow inputted to the switch 100.

(Step S32) The priority determination section 112 determines whether or not a value of the priority acquired in step S31 is greater than or equal to a determined value (6, for example). If the value of the priority is greater than or equal to the determined value, then step S34 is performed next. On the other hand, if the value of the priority is smaller than the determined value, then step S33 is performed next.

(Step S33) The priority determination section 112 determines whether or not a destination MAC address indicated by control information included in a header section of the frame of the data flow is a determined MAC address. If the destination MAC address is the determined MAC address, then step S34 is performed next. On the other hand, if the destination MAC address is not the determined MAC address, then step S35 is performed next.

(Step S34) The priority determination section 112 determines that the priority is "high". After that, the process returns.

(Step S35) The priority determination section 112 determines that the priority is "low". After that, the process returns.

According to the second embodiment, as has been described, a link speed is changed according to priority determined on the basis of priority or a destination MAC address included in control information in a header section of a frame. Accordingly, by reducing a transmission speed of lower priority data, the amount of high-speed communication the power consumption of which is high can be reduced rationally and the power consumption of the switch 100 can be reduced.

Furthermore, there are two methods for adjusting a delay in the transmitting or receiving of data caused by a change in link speed. One method is to use a transmit-receive buffer for storing data and to resume the transmitting or receiving of the data after the re-establishment of a link on which a speed after the change is used. The other method is to use retransmission performed at the time of the occurrence of a transmission or receiving error on the basis of a communication protocol. These methods are ordinary functions which a switch or an information processing apparatus that communicates with a switch has, so it is possible to realize these functions without adding a new function. As a result, the power consumption of the switch 100 can be reduced economically.

(Third Embodiment)

A third embodiment will now be described. The difference between the above second embodiment and a third embodiment will mainly be described. The same symbols are used for indicating the same components and descriptions of them will be omitted.

In the third embodiment a layer 3 switch which relays a packet at the network layer on the basis of an IP address will be described as an example. Furthermore, for convenience of explanation, the term "packet" will be used uniformly in the third embodiment for representing the unit of data at the layer 3 in the OSI reference model.

In this embodiment the case where a TCP packet based on TCP (Transmission Control Protocol) is transferred will be described. However, a UDP packet based on UDP (User Datagram Protocol) or a packet based on another protocol can also be transferred in the same way.

Figure 12:
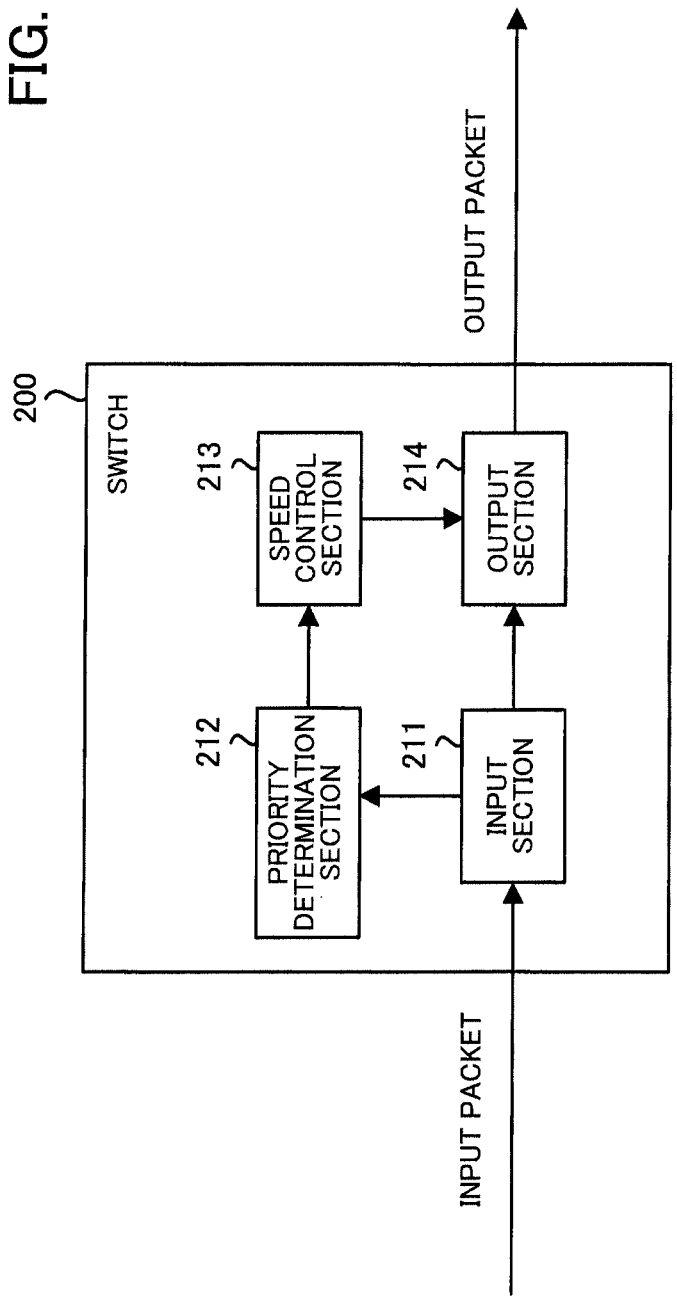
FIG. 12 a block diagram of a switch according to a third embodiment.

FIG. 12 a block diagram of a switch according to a third embodiment. A switch 200 according to this embodiment illustrated in FIG. 12 can be used in a system which is the same as that illustrated in FIG. 2 by connecting it to another switch or information processing apparatus.

On the basis of control information, such as QoS, included in data transmitted or received, the switch 200 in this embodiment changes a packet transmission speed according to the priority of a data flow indicated by packets into which the data is divided. The switch 200 includes an input section 211, a priority determination section 212, a speed control section 213, and an output section 214.

The switch 200 in this embodiment is a layer 3 switch and transmits or receives data by dividing it into a plurality of packets. Each of the packets into which the data is divided includes control information in its header section. The control information is used for transferring the data. As indicated in FIG. 4, the control information included in the header section includes priority information indicative of priority for transmitting the data and a destination IP address indicative of an address to which the data is transmitted.

The input section 211 can be connected via a physical link, such as a LAN, to another switch or information processing apparatus having a communication function. Data transmitted from such an apparatus is inputted to the input section 211 as input packets.

The priority determination section 212 determines the priority of a data flow inputted by the input section 211 in the form of a packet. The priority determination section 212 determines the priority of a data flow on the basis of information indicative of whether or not it is necessary to transmit the data at a high speed. Priority in a ToS field, a destination IP address, port number information indicative of a destination port number, or the like indicated by control information included in a header of a packet corresponds to such information.

If at this time the value of priority indicated by control information included in a header section of a data packet inputted from the input section 211 is higher than a determined value, then the priority determination section 212 determines that the priority of the data flow is high. On the other hand, if the value of the priority indicated by the control information included in the header section of the data packet inputted from the input section 211 is lower than the determined value, then the priority determination section 212 determines that the priority of the data flow is low.

In addition, if a destination IP address indicated by the control information included in the header section of the data packet inputted from the input section 211 is a determined address, then the priority determination section 212 determines regardless of the value of the priority that the priority of the data flow is high. On the other hand, if the destination IP address indicated by the control information included in the header section of the data packet inputted from the input section 211 is not the determined address, then the priority determination section 212 determines that the priority of the data flow is low.

An IP address indicates an information processing apparatus at the other end of communication. That is to say, in this embodiment priority can be determined according to information processing apparatus at the other end of communication.

Furthermore, if destination port number information indicated by the control information included in the header section of the data packet inputted from the input section 211 indicates a determined port number, then the priority determination section 212 determines regardless of the value of the priority that the priority of the data flow is high. On the other hand, if the destination port number information indicated by the control information included in the header section of the data packet inputted from the input section 211 does not indicate the determined port number, then the priority determination section 212 determines that the priority of the data flow is low.

A TCP or UDP port number indicates an application or service which is performed on an information processing apparatus at the other end of communication and which processes data transmitted or received. That is to say, in this embodiment priority can be determined according to application or service which processes data transmitted or received.

For example, if importance is given to a transmission speed of data transmitted on the basis of FTP (File Transfer Protocol), then the port number "20" or "21" for FTP is set in advance as a determined port number. By doing so, the determination that the priority of an FTP packet is high is made. As a result, a transmission speed on a link along which data is transmitted can be maintained. Conversely, if importance is not given to a transmission speed of data transmitted on the basis of FTP and priority is given to power saving, then the priority of a packet in which the port number "20" is set is lowered. By doing so, a link transmission speed becomes low and power saving can be realized.

By specifying an application which processes data from a port number set in a packet in this way, priority can be set accurately and properly according to a use for the data.

In addition, the priority of a data flow can be determined by combining the above destination information processing apparatus and an application or service which processes data.

The priority determination section 212 may indicate a priority determination result by one of three or more ranks. For example, the priority determination section 112 may indicate a priority determination result by one of three ranks: "low," "medium," and "high".

If the priority of the data flow determined by the priority determination section 212 is higher than the determined value, then the speed control section 213 sets a transmission speed of data outputted from the output section 214 to a high value. On the other hand, if the priority of the data flow determined by the priority determination section 212 is lower than the determined value, then the speed control section 213 sets a transmission speed of data outputted from the output section 214 to a low value. By doing so, data can be transmitted or received at a transmission speed corresponding to priority determined.

The output section 214 outputs data as an output packet at a set transmission speed. The data outputted from the output section 214 is transferred to another switch or information processing apparatus via a physical link such as a LAN. At this time the output section 214 temporarily disconnects links established between a plurality of output ports (not illustrated) included in the output section 214 and destinations to which data is transferred, and establishes the links again at transmission speeds corresponding to the results of priority determination by the priority determination section 212. By doing so, the output section 214 changes data transmission speeds to transmission speeds set by the speed control section 213.

In this embodiment priority is determined on the basis of information included in a header section of a packet inputted to the switch 200. However, priority may be determined on the basis of information included in a header section of a packet outputted from the switch 200.

Furthermore, the switch 200 according to this embodiment is a layer 3 switch. However, a router or an apparatus having the same function as a layer 3 switch or a router has may be used.

Figure 13:
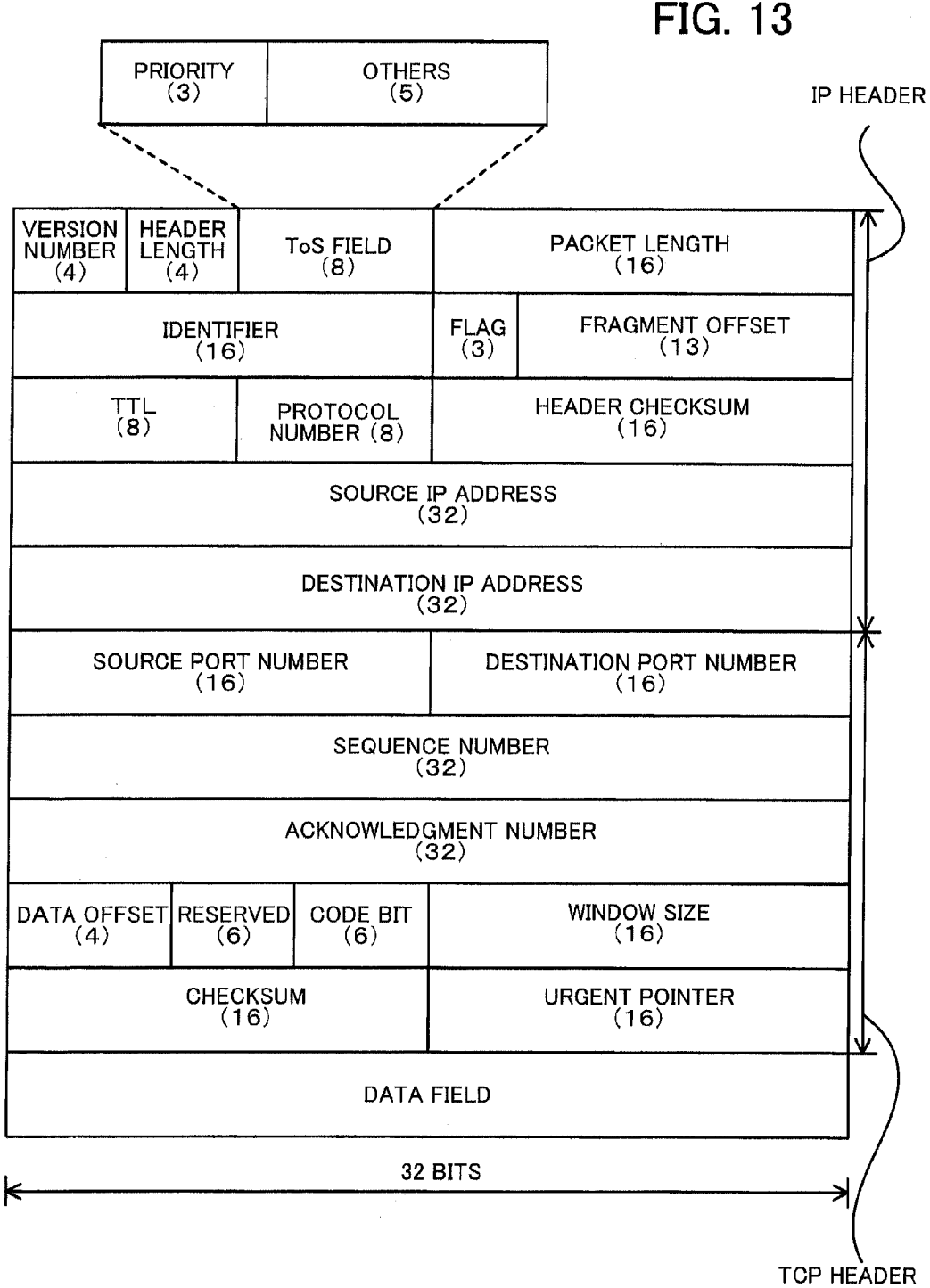
FIG. 13 is an example of the data structure of a packet in the third embodiment.

FIG. 13 is an example of the data structure of a packet in the third embodiment. In this embodiment a packet illustrated in FIG. 13 is exchanged between the switch 100 described above in FIG. 2 and another switch or the like (not illustrated) via a communication port which is the same as the communication port of the interface card 102a, 102b, 102c, or 102d described above in FIG. 3.

A packet illustrated in FIG. 13 includes an IP header and a TCP header both of which include control information.

The IP header includes Version Number, Header Length, ToS, Packet Length, Identifier, Flag, Fragment Offset, TTL (Time To Live), Protocol Number, Header Checksum, Source IP Address, and Destination IP Address fields. In addition, the ToS field includes Priority and Others subfields.

The TCP header includes Source Port Number, Destination Port Number, Sequence Number, Acknowledgment Number, Data Offset, Reserved, Code Bit, Window Size, Checksum, and Urgent Pointer fields.

In addition to the IP header and the TCP header, the packet includes a data field. Furthermore, a number in parentheses in FIG. 13 indicates the number of bits in each field.

The Version Number field is a 4-bit area in which an IP version is indicated. In the case of an IPv4 packet, for example, the value "4" is set in this field. In the case of an IPv6 packet, the value "6" is set in this field. In this embodiment description will be given with an IPv4 packet as an example.

The Header Length field is a 4-bit area in which the size of a header section of a packet is indicated.

The ToS field is an 8-bit area in which the priority of a packet data flow and the like are indicated. The Priority subfield included in the ToS field is a 3-bit area in which the priority of a packet data flow is indicated. The Others subfield is a 5-bit area which can be used for other purposes. On the basis of DSCP in DiffServ, identification information can also be indicated in the Priority subfield which is extended to six bits by adding three of the five bits of the Others subfield.

The Packet Length field is a 16-bit area in which the size of an entire packet is indicated in bytes.

The Identifier field is a 16-bit area in which a packet identification value used in IP fragmentation is indicated.

The Flag field is a 3-bit area in which instructions that are given at the time of packet fragmentation and assembly and that are used in IP fragmentation are indicated.

The Fragment Offset field is a 13-bit area in which the position of fragmented packet data in original data used in IP fragmentation is indicated.

The TTL field is an 8-bit area in which the lifetime of a packet is indicated.

The Protocol Number field is an 8-bit area in which the type of a network protocol at the transport layer is indicated.

The Header Checksum field is a 16-bit area in which a checksum in the IP header is indicated.

The Source IP Address field is a 32-bit area in which an IP address of a source computer is indicated.

The Destination IP Address field is a 32-bit area in which an IP address of a destination computer is indicated.

The Source Port Number field is a 16-bit area in which a port number of a packet source is indicated. A source application can be identified by a source port number.

The Destination Port Number field is a 16-bit area in which a port number of a packet destination is indicated. An application which uses packet data at a destination can be identified by a destination port number.

The Sequence Number field is a 32-bit area in which the sequence of data that is divided into packets for transmission is indicated.

The Acknowledgment Number field is set in a response packet and is a 32-bit area in which to what extent data has been received by a destination is indicated.

The Data Offset field is a 4-bit area in which the size of the TCP header is indicated.

The Reserved field is a 6-bit area unused.

The Code Bit field is a 6-bit area in which various flags for control are indicated.

The Window Size field is a 16-bit area in which the size of a window that can be received is indicated.

The Checksum field is a 16-bit area in which checksums in the TCP header and a Data field are indicated.

The Urgent Pointer field is used when an URG (urgent) flag which is indicative that urgent data is included in a TCP packet is on. The Urgent Pointer field is a 16-bit area in which the position and size of the urgent data are indicated.

The Data field is a variable length area in which data proper to be transmitted or received by an IP packet is stored.

Various modifications of the data structure of a packet are possible according to, for example, the form of the operation of a network. For example, information other than that indicated in FIG. 13 may be added. On the other hand, a part of the information indicated in FIG. 13 may be omitted.

Figure 14:
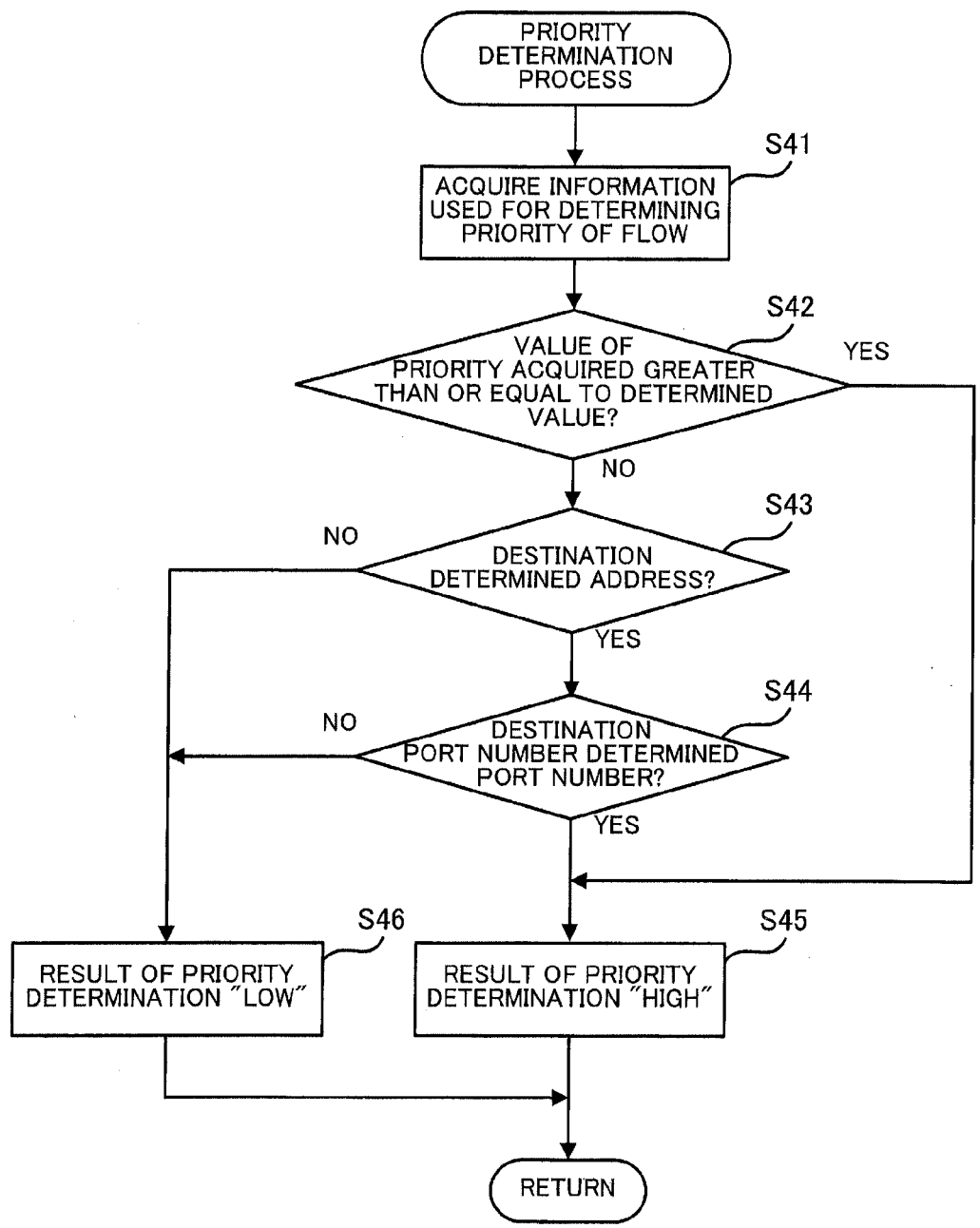
FIG. 14 is a flow chart of a procedure for a priority determination process in the third embodiment.

FIG. 14 is a flow chart of a procedure for a priority determination process in the third embodiment. A priority determination process indicated in FIG. 14 is performed for determining the priority of a data flow inputted to the switch 200 on the basis of a packet included in the data flow. A priority determination process in this embodiment is invoked and performed in step S11 of a speed control process (described above in FIGS. 9 and 10) which is also performed in this embodiment. This is the same with the priority determination process in the second embodiment indicated in FIG. 11.

(Step S41) The priority determination section 212 (described above in FIG. 12) acquires priority included in a packet of a data flow inputted to the switch 200.

(Step S42) The priority determination section 212 determines whether or not a value of the priority acquired in step S41 is greater than or equal to a determined value (4, for example). If the value of the priority is greater than or equal to the determined value, then step S45 is performed next. On the other hand, if the value of the priority is smaller than the determined value, then step S43 is performed next.

(Step S43) The priority determination section 212 determines whether or not a destination IP address indicated by control information included in an IP header section of the packet of the data flow is a determined IP address ("192.1.1.1", for example). If the destination IP address is the determined IP address, then step S44 is performed next. On the other hand, if the destination IP address is not the determined IP address, then step S46 is performed next.

(Step S44) The priority determination section 212 determines whether or not a destination port number indicated by control information included in a TOP header section of the packet of the data flow is a determined port number ("20" or "21", for example). If the destination port number is the determined port number, then step S45 is performed next. On the other hand, if the destination port number is not the determined port number, then step S46 is performed next.

(Step S45) The priority determination section 212 determines that the priority is "high". After that, the process returns.

(Step S46) The priority determination section 212 determines that the priority is "low". After that, the process returns.

According to the third embodiment, as has been described, the switch 200 is a layer 3 switch or the like which transfers an IP packet. Even in this case, the same effect that is obtained in the second embodiment can be realized by using priority indicated in a ToS field included in an IP packet.

In addition, priority is determined on the basis of a source port number or a destination port number, so priority can be determined according to an application used on an information processing apparatus on the client side. As a result, the priority of packets used for transmitting or receiving data for an application which needs a high link transmission speed is raised. By doing so, the data can be transmitted or received at a high speed.

(Fourth Embodiment)

A fourth embodiment will now be described. The difference between the above second embodiment and a fourth embodiment will mainly be described. The same symbols are used for indicating the same components and descriptions of them will be omitted.

In the fourth embodiment description will be given with an information processing apparatus which sets a link transmission speed on the basis of priority indicated by a packet especially at the data link layer as an example. However, it is possible to set a link transmission speed on the basis of priority indicated by a packet, for example, at the network layer. Furthermore, the unit of data at layer 2 in the OSI reference model may also be referred to as a "packet". For convenience of explanation, however, the term "frame" will be used uniformly in the fourth embodiment. This is the same with the second embodiment.

Figure 15:
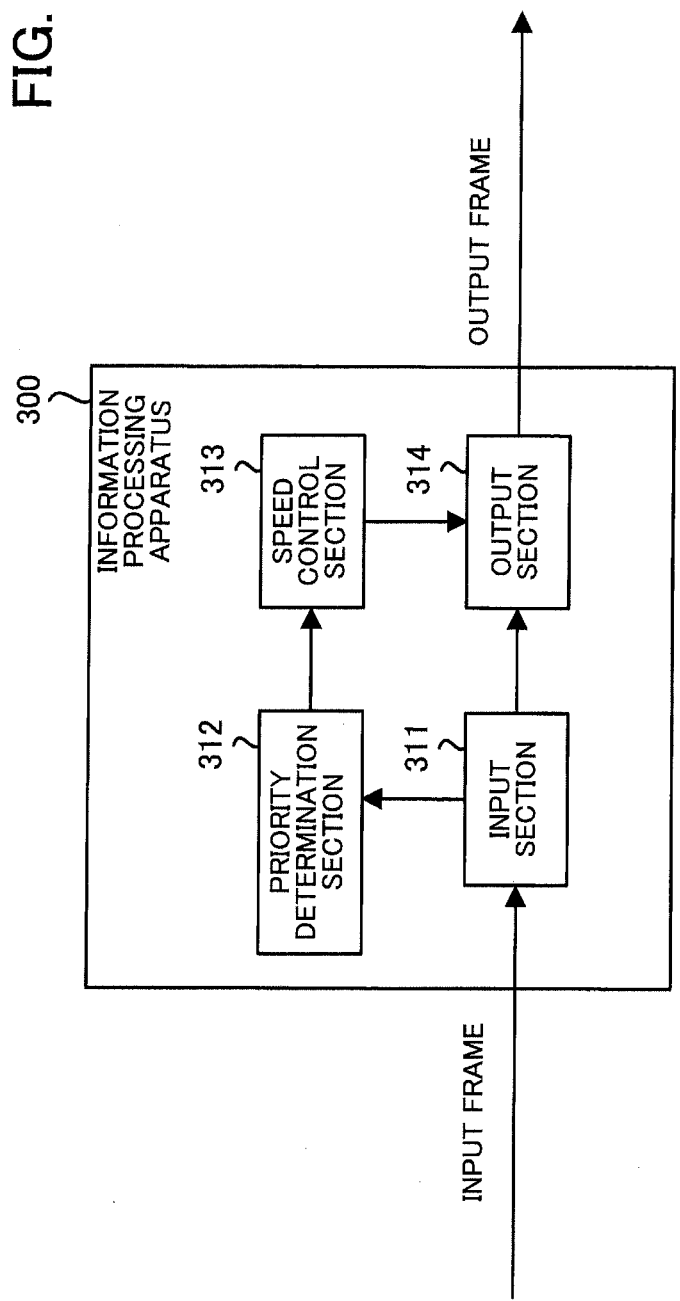
FIG. 15 is a block diagram of an information processing apparatus according to a fourth embodiment.

FIG. 15 is a block diagram of an information processing apparatus according to the fourth embodiment. An information processing apparatus 300 according to this embodiment illustrated in FIG. 15 can be used in a system which is the same as that illustrated in FIG. 2 by connecting it to a switch.

On the basis of control information, such as QoS, included in data transmitted or received, the information processing apparatus 300 according to this embodiment changes a frame transmission speed according to the priority of a data flow indicated by frames into which the data is divided. The information processing apparatus 300 includes an input section 311, a priority determination section 312, a speed control section 313, and an output section 314.

The information processing apparatus 300 according to this embodiment can perform communication by the use of a layer 2 frame and transmits or receives data by dividing it into a plurality of frames. Each of the frames into which the data is divided includes control information in its header section. The control information is used for transferring the data. As described above in FIG. 4, the control information included in the header section includes priority information indicative of priority in data transmission and destination address information indicative of an MCA address of a frame destination. A destination address included in each frame is a MAC address.

The input section 311 can be connected via a physical link, such as a LAN, to another switch or information processing apparatus having a communication function. Data transmitted from such an apparatus is inputted to the input section 311 as input frames.

The priority determination section 312 determines the priority of a data flow inputted by the input section 311 in the form of a frame. The priority determination section 312 determines the priority of a data flow on the basis of information indicative of whether or not it is necessary to transmit the data at a high speed. Priority in a ToS field, a destination MAC address, or the like indicated by control information included in a header of a frame corresponds to such information.

If at this time the value of priority (described above in FIG. 4) indicated by control information included in a header section of a data frame inputted from the input section 311 is higher than a determined value, then the priority determination section 312 determines that the priority of the data flow is high. On the other hand, if the value of the priority indicated by the control information included in the header section of the data frame inputted from the input section 311 is lower than the determined value, then the priority determination section 312 determines that the priority of the data flow is low.

In addition, if a destination MAC address indicated by the control information included in the header section of the data frame inputted from the input section 311 is a determined address such as a source MAC address, then the priority determination section 312 determines that the priority of the data flow is high. On the other hand, if the destination MAC address indicated by the control information included in the header section of the data frame inputted from the input section 311 is not the determined address, then the priority determination section 312 determines that the priority of the data flow is low. As a result, when the information processing apparatus 300 communicates with a determined apparatus, the information processing apparatus 300 can set a high priority and ensure high-speed communication.

The priority determination section 312 may indicate a priority determination result by one of three or more ranks. For example, the priority determination section 312 may indicate a priority determination result by one of three ranks: "low," "medium," and "high".

If the priority of the data flow determined by the priority determination section 312 is higher than the determined value, then the speed control section 313 sets a transmission speed of data outputted from the output section 314 to a high value. On the other hand, if the priority of the data flow determined by the priority determination section 312 is lower than the determined value, then the speed control section 313 sets a transmission speed of data outputted from the output section 314 to a low value. By doing so, data can be transmitted or received at a transmission speed corresponding to priority determined.

The output section 314 outputs data as an output frame at a set transmission speed. The data outputted from the output section 314 is transferred to another switch or information processing apparatus via a physical link such as a LAN. At this time the output section 314 temporarily disconnects links established between a plurality of output ports (not illustrated) included in the output section 314 and destinations to which data is transferred, and establishes the links again at transmission speeds corresponding to the results of priority determination by the priority determination section 312. By doing so, the output section 314 changes data transmission speeds to transmission speeds set by the speed control section 313.

In this embodiment priority is determined on the basis of information included in a header section of a frame inputted to the information processing apparatus 300. However, priority may be determined on the basis of information included in a header section of a frame outputted from the information processing apparatus 300.

Furthermore, the information processing apparatus 300 determines the priority of a data flow on the basis of a layer 2 frame. However, the information processing apparatus 300 may determine the priority of a data flow on the basis of a layer 3 packet.

Figure 16:
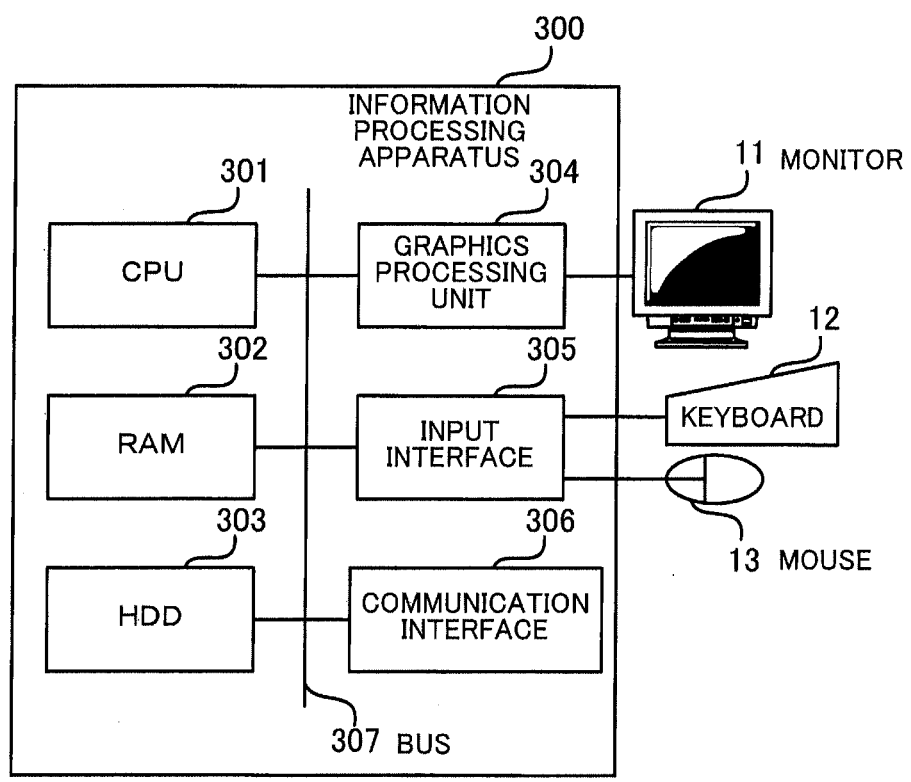
FIG. 16 illustrates the hardware configuration of the information processing apparatus according to the fourth embodiment.

FIG. 16 illustrates the hardware configuration of the information processing apparatus according to the fourth embodiment. The whole of the information processing apparatus 300 illustrated in FIG. 16 is controlled by a CPU (Central Processing Unit) 301. A RAM (Random Access Memory) 302, an HDD (Hard Disk Drive) 303, a graphics processing unit 304, an input interface 305, and a communication interface 306 are connected to the CPU 301 via a bus 307.

The RAM 302 temporarily stores at least a part of an OS (Operating System) program or an application software program (application program) executed by the CPU 301. The RAM 302 also stores various pieces of data which the CPU 301 needs to perform a process. The HDD 303 stores the OS program and application programs.

A monitor 11 is connected to the graphics processing section 304. In accordance with instructions from the CPU 301, the graphics processing unit 304 displays an image on a screen of the monitor 11. A keyboard 12 and a mouse 13 are connected to the input interface 305. The input interface 305 transmits a signal transmitted from the keyboard 12 or the mouse 13 to the CPU 301 via the bus 307.

The communication interface 306 can be connected to a network (not illustrated). The communication interface 306 can exchange data with another switch (above switch 100, for example) or computer via the network.

By adopting the above hardware configuration, processing functions in this embodiment can be realized.

Figure 17:
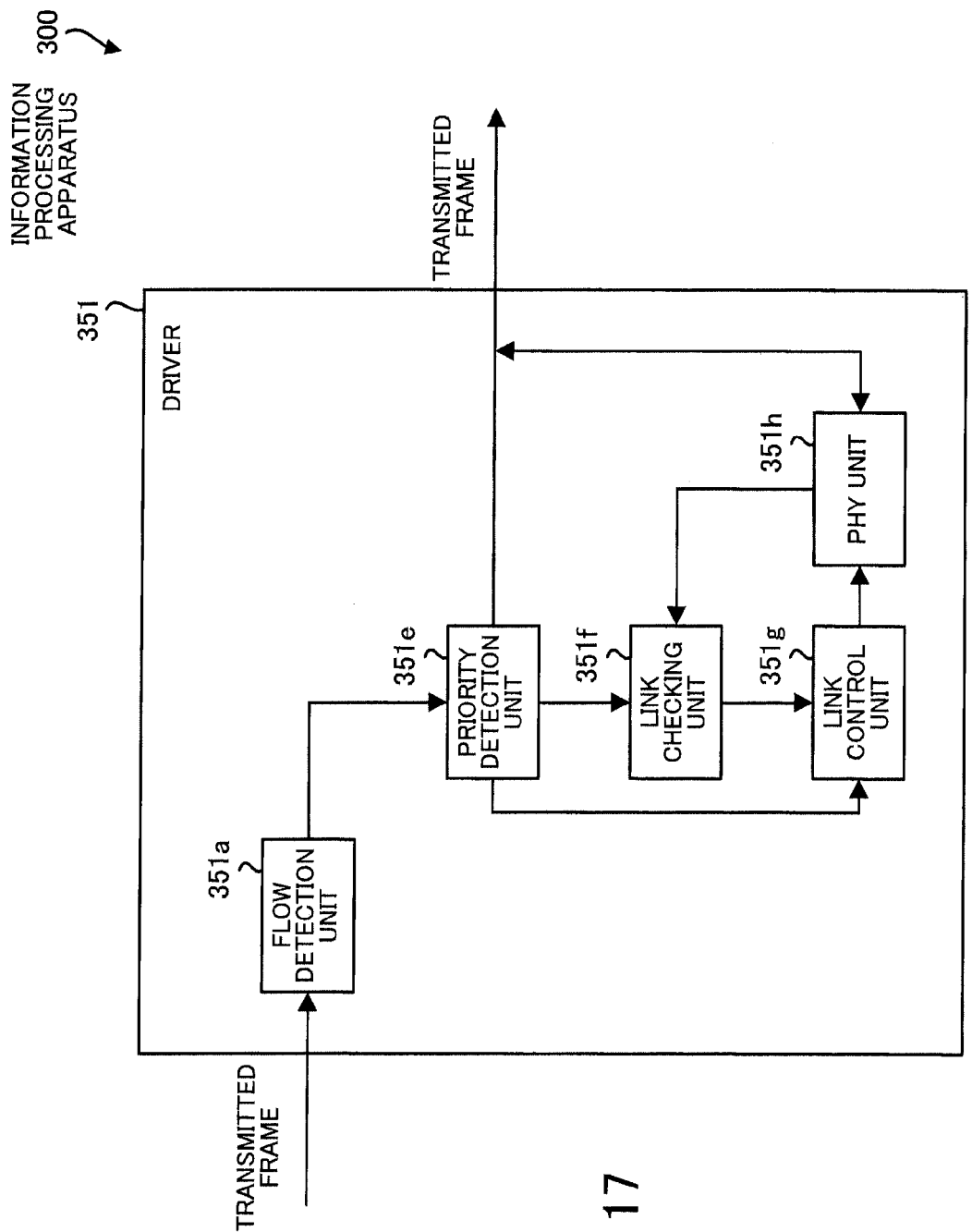
FIG. 17 is a block diagram of a driver according to the fourth embodiment.

FIG. 17 is a block diagram of a driver according to the fourth embodiment. A driver 351 which is illustrated in FIG. 17 and which functions in the information processing apparatus 300 outputs a frame transmitted from the information processing apparatus 300 to a switch or the like which transfers it to a destination. The driver 351 includes a flow detection unit 351a, a priority detection unit 351e, a link checking unit 351f, a link control unit 351g, a PHY unit 351h.

The flow detection unit 351a detects a flow transmitted from the information processing apparatus 300 on the basis of control information included in a header section of a frame.

The priority detection unit 351e detects priority of the data flow from control information included in a header section of a frame transmitted from the information processing apparatus 300, and controls the link checking unit 351f and the link control unit 351g.

The link checking unit 351f checks the state of a link with another switch or the like connected to an output port (not illustrated) of the information processing apparatus 300, and maintains data for the state of the last link.

The link control unit 351*g* changes a link transmission speed.

The PHY unit 351*h* is at the first layer in the OSI reference model and is a physical connection of a network.

As has been described in the foregoing, in the fourth embodiment the information processing apparatus 300 on the client side of communication used by a user can set the priority of a data flow and set a transmission speed. That is to say, the information processing apparatus 300 can set the priority of a data flow in accordance with determination by the user or an application. As a result, a switch or the like can set priority flexibly and accurately compared with, for example, the case where the priority of a data flow is determined formally or routinely according to the type of a frame or a packet.

In addition, the information processing apparatus 300 has the function of setting a link transmission speed on the basis of priority. As a result, a link can be established at a proper transmission speed on a communication line between the information processing apparatus 300 on the client side and a communication apparatus, such as a switch, from the time when data is transmitted from the information processing apparatus 300. Accordingly, the effect of power saving is enhanced.

The above functions can be realized with a computer. In this case, a program in which the contents of the functions the switch 100, the switch 200, or the information processing apparatus 300 should have are described is provided. By executing this program on the computer, the above functions are realized on the computer.

This program can be recorded on a computer readable record medium. A computer readable record medium can be a magnetic recording device, an optical disk, a magneto-optical recording medium, a semiconductor memory, or the like. A magnetic recording device can be an HDD, a FD (Flexible Disc), a MT (magnetic tape), or the like. An optical disc can be a DVD (Digital Versatile Disc), a DVD-RAM (Random Access Memory), a CD-ROM (Compact Disc-Read Only Memory), CD-R (Recordable)/RW (ReWritable), or the like. A magneto-optical recording medium can be a MO (Magneto-Optical disk) or the like.

To place the program on the market, portable record media, such as DVDs or CD-ROMs, on which it is recorded are sold. Alternatively, the program is stored in advance in a server computer and is transferred from the server computer to another computer via a network.

When the computer executes this program, it will store the program, which is recorded on a portable record medium or which is transferred from the server computer, in, for example, its storage device. Then the computer reads the program from its storage device and performs processes in compliance with the program. The computer can also read the program directly from a portable record medium and perform processes in compliance with the program. Furthermore, each time the program is transferred from the server computer, the computer can perform processes in turn in compliance with the program it receives.

According to the disclosed communication apparatus, information processing apparatus, and communication control method, a transmission speed is changed on the basis of priority for data communication. By doing so, a transmission speed of lower priority data is controlled. As a result, power saving can be realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A communication apparatus comprising:
an input section to which data is inputted;
a priority determination section which determines priority of the data inputted by the input section;
an output section which outputs the data at a set transmission speed; and
a speed control section which sets the transmission speed of the data outputted from the output section to a high value in a case of the priority of the data determined by the priority determination section being higher than a determined value and which sets the transmission speed of the data outputted from the output section to a low value in a case of the priority of the data determined by the priority determination section being lower than the determined value, wherein:
the data includes control information used for transferring the data;
the control information includes destination address information indicative of a destination address of the data; and
the priority determination section determines, on the basis of the destination address information included in the control information included in the data inputted from the input section, that the priority of the data is higher than the determined value, the destination address information indicating a determined address.

2. The communication apparatus according to claim 1, wherein:
the control information includes priority information indicative of priority for communicating the data; and
the priority determination section determines the priority of the data on the basis of the priority information included in the control information included in the data inputted from the input section.

3. The communication apparatus according to claim 1, wherein the output section changes the transmission speed to the set transmission speed by disconnecting a link with a destination of the data and establishing a link again at a transmission speed corresponding to a result of priority determination by the priority determination section.

4. The communication apparatus according to claim 1, wherein:
the destination address information indicates a MAC address which is a destination of the data; and
the data is transmitted or received by a frame including the destination address information indicated by the MAC address as the control information.

5. The communication apparatus according to claim 1, wherein:
the destination address information indicates an IP address which is a destination of the data; and
the data is transmitted or received by a packet including the destination address information indicated by the IP address as the control information.

6. A communication apparatus comprising:
an input section to which data is inputted;

a priority determination section which determines priority of the data inputted by the input section;

an output section which outputs the data at a set transmission speed; and a speed control section which sets the transmission speed of the data outputted from the output section to a high value in a case of the priority of the data determined by the priority determination section being higher than a determined value and which sets the transmission speed of the data outputted from the output section to a low value in a case of the priority of the data determined by the priority determination section being lower than the determined value, wherein:

the data includes control information used for transferring the data;

the control information includes port number information indicative of a number of a destination port of the data; and the priority determination section determines, on the basis of the port number information included in the control information included in the data inputted from the input section, that the priority of the data is higher than the determined value, the port number information indicating a determined port number.

7. A communication apparatus comprising:
an input section to which data is inputted;
a priority determination section which determines priority of the data inputted by the input section;
an output section which outputs the data at a set transmission speed; and
a speed control section which sets the transmission speed of the data outputted from the output section to a high value in a case of the priority of the data determined by the priority determination section being higher than a determined value and which sets the transmission speed of the data outputted from the output section to a low value in a case of the priority of the data determined by the priority determination section being lower than the determined value, wherein the speed control section:
sets the transmission speed of the data outputted from the output section to a first speed in the case of the priority of the data determined by the priority determination section being higher than the determined value; and
sets the transmission speed of the data outputted from the output section to a second speed lower than the first speed in the case of the priority of the data determined by the priority determination section being lower than the determined value.

8. A communication control method comprising:
determining, by a priority determination section, priority of data inputted from an input section; and
setting, by a speed control section, a transmission speed of the data outputted from an output section to a high value in a case of the priority of the data determined by the priority determination section being higher than a determined value, and setting, by the speed control section, the transmission speed of the data outputted from the output section to a low value in a case of the priority of the data determined by the priority determination section being lower than the determined value,
wherein the priority determination section determines, on the basis of destination address information included in control information included in the data inputted from the input section, that the priority of the data is higher than the determined value, the destination address information indicating a determined address.

9. The communication control method according to claim 8, wherein the priority determination section determines the priority of the data on the basis of priority information included in the control information included in the data inputted from the input section.

10. The communication control method according to claim 8, wherein the output section changes the transmission speed to a set transmission speed by disconnecting a link with a destination of the data and establishing a link again at a transmission speed corresponding to a result of priority determination by the priority determination section.

11. A communication control method comprising:
determining, by a priority determination section, priority of data inputted from an input section; and
setting, by a speed control section, a transmission speed of the data outputted from an output section to a high value in a case of the priority of the data determined b the priority determination section being higher than a determined value, and setting, by the speed control section, the transmission speed of the data outputted from the output section to a low value in a case of the priority of the data determined by the priority determination section being lower than the determined value,
wherein the priority determination section determines, on the basis of port number information included in control information included in the data inputted from the input section, that the priority of the data is higher than the determined value, the port number information indicating a determined port number.

12. A communication control method comprising:
determining, by a priority determination section, priority of data inputted from an input section; and
setting, by a speed control section, a transmission speed of the data outputted from an output section to a high value in a case of the priority of the data determined by the priority determination section being higher than a determined value, and setting, by the speed control section, the transmission speed of the data outputted from the output section to a low value in a case of the priority of the data determined by the priority determination section being lower than the determined value,
wherein the speed control section:
sets the transmission speed of the data outputted from the output section to a first speed in the case of the priority of the data determined by the priority determination section being higher than the determined value; and
sets the transmission speed of the data outputted from the output section to a second speed lower than the first speed in the case of the priority of the data determined by the priority determination section being lower than the determined value.

13. The communication control method according to claim 12, wherein:
the data inputted from the input section includes control information including destination address information,
the destination address information indicates a MAC address which is a destination of the data; and
the data is transmitted or received by a frame including the destination address information indicated by the MAC address as the control information.

14. The communication control method according to claim 12, wherein:
the data inputted from the input section includes control information including destination address information,
the destination address information indicates an IP address which is a destination of the data; and the data is transmitted or received by a packet including the destination address information indicated by the IP address as the control information.

\* \* \* \* \*

UNITED STATES PATENT AND TRADEMARK OFFICE
CERTIFICATE OF CORRECTION

PATENT NO. : 8,806,087 B2  
APPLICATION NO. : 13/340413  
DATED : August 12, 2014  
INVENTOR(S) : Naozumi Anzai Page 1 of 1

It is certified that error appears in the above-identified patent and that said Letters Patent is hereby corrected as shown below:

In the Claims

Column 20, Line 18, In Claim 11, delete "determined b the" and insert -- determined by the --, therefor.

Signed and Sealed this  
Fourth Day of November, 2014

Michelle K. Lee  
*Deputy Director of the United States Patent and Trademark Office*